United States Patent [19]
Gaskill

[11] Patent Number: 5,067,640
[45] Date of Patent: Nov. 26, 1991

[54] UNIVERSAL WHEELLESS CARRIER

[76] Inventor: Albert Gaskill, 22644 Point Dr., St. Clair Shores, Mich. 48081

[21] Appl. No.: 452,542

[22] Filed: Dec. 18, 1989

[51] Int. Cl.⁵ .............................................. B60R 9/00
[52] U.S. Cl. ............................. 224/42.07; 224/42.43; 224/42.03 B; 224/42.03 A
[58] Field of Search ............... 224/42.07, 42.08, 42.43, 224/42.44, 42.03 R, 42.03 B, 42.45 R, 310, 324, 42.03 A

[56] References Cited

U.S. PATENT DOCUMENTS

| | | | |
|---|---|---|---|
| 1,906,920 | 5/1933 | Sheffer | 224/42.07 |
| 2,660,452 | 11/1953 | Johnson, Jr. | 224/42.43 |
| 3,334,761 | 8/1967 | Perri | 224/42.08 |
| 3,796,333 | 3/1974 | Goldstein | 224/42.44 |
| 4,277,008 | 7/1981 | McCleary . | |
| 4,635,835 | 1/1987 | Cole . | |
| 4,676,414 | 6/1987 | Deguevara | 224/42.03 B |
| 4,799,609 | 1/1989 | Castilla | 224/42.07 |
| 4,813,584 | 3/1989 | Wiley . | |
| 4,815,638 | 3/1989 | Hutyra . | |
| 4,823,997 | 4/1989 | Krieger . | |
| 4,906,015 | 3/1990 | Lacroix et al. | 224/42.07 |

Primary Examiner—Linda J. Sholl
Attorney, Agent, or Firm—Dykema Gossett

[57] ABSTRACT

A universal carrier for transporting a load which allows easy loading and unloading of cargo. The carrier is of the type which is cantilevered from the trailer hitch of the transporting vehicle and accordingly does not use any carrier wheels to support the load. A universal main support member is provided so that any number of platforms can be attached, thereby allowing the carrier to possess universal carrying capabilities. The carrier's main support structure is designed so that large loads may be placed upon it without having to step over any structural support members.

20 Claims, 6 Drawing Sheets

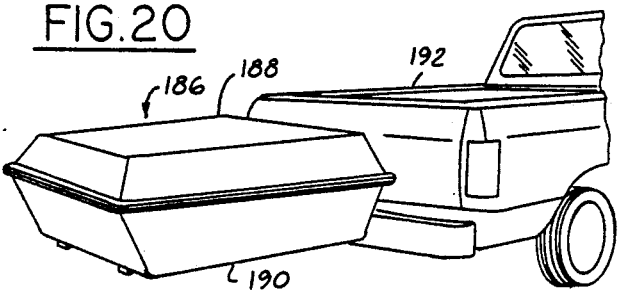
FIG.20
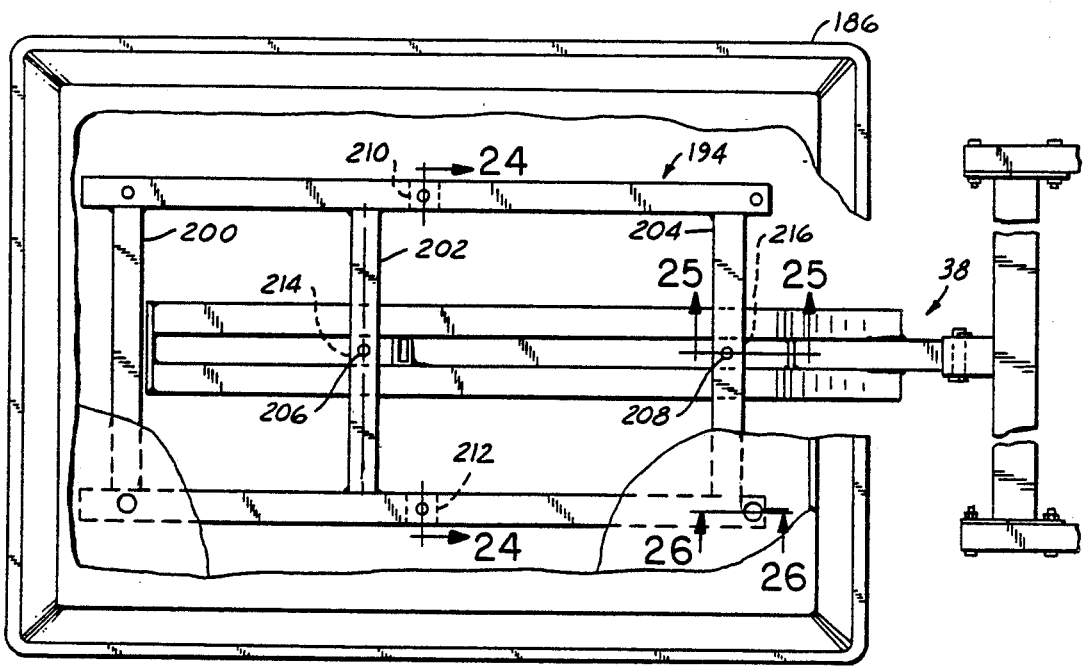
FIG.21
FIG.22

UNIVERSAL WHEELLESS CARRIER

TECHNICAL FIELD

This invention generally relates to carriers of the type which are attached to vehicles and are used for carrying various types of loads. More particularly, this invention relates to wheelless carriers which are mounted to and cantilevered from a trailering hitch system of a transporting vehicle.

BACKGROUND OF THE INVENTION

One of the most common devices used for transporting cargo is a two-wheel utility trailer. This trailer has universal applicability because it can be pulled behind almost any type of four-wheel vehicle. Two-wheel utility trailers usually consist of two wheels attached to an axle which in turn supports some type of a cargo bed. The axle and cargo bed are attached via a frame network which is ultimately connected to the towing vehicle by way of a vehicle trailer hitch.

Although trailering devices of this type are extremely popular, they are not without drawbacks. One such drawback is that in most states trailers such as this must be licensed by the state if they are to be operated on public roads. Another such drawback is that devices of this nature usually are costly to maintain inasmuch as tires must be periodically replaced due to wear, and wheel bearings must be periodically greased. Other costs involved in owning a two-wheel trailer involve costs of storage and replacement insurance.

It is also well known that the gas mileage of the transporting vehicle is reduced when pulling a two-wheel utility trailer due to increased air and road friction experienced by the trailer. Utility trailers also tend to be fairly large and cumbersome when they are being maneuvered both on the road and by hand.

Many people who have a need for a general purpose carrier device do not want to incur the additional expense of purchasing a two-wheel trailer and also do not want the problems which are associated with maintaining, storing and pulling a trailer.

Although various types of carriers have been developed by others for attaching to vehicles, none of them have the universal appeal of the conventional two-wheel trailer without having some or all of its drawbacks. For example, some carriers have been developed which are capable of being mounted directly to the transporting vehicle's trailer hitch for the purposes of carrying bicycles and off-road vehicles. But these devices are very cargo-specific and cannot be used outside of the specific type of load they are designed to carry.

U.S. Pat. No. 4,813,584 issued to Wiley on Mar. 21, 1989 shows a detachable cargo carrier engagable with a standard trailer hitch. The carrier includes a rectangular frame which supports an enclosed cargo carrier. The patent also discloses a rectangular frame which is adapted to transport a bicycle. The Wiley patent overcomes some of the problems inherent in the prior art carriers, but is not without its own drawbacks. For example, the device disclosed in Wiley does not provide for the easy loading and unloading of three-wheel and four-wheel all terrain vehicles. Wiley also fails to teach a cargo carrier which can be adapted to carry a plurality of off-road vehicles, including motorcycles, all-terrain vehicles and small watercraft such as the Sea-Doo TM Bombardier (Bombardier is a trademark of Bombardier, Inc.).

U.S. Pat. No. 4,823,997 issued to Krieger on Apr. 25, 1989 shows a carrier for transporting a two-wheel cycle. This carrier is of the type which is cantilevered from a transporting vehicle's trailer hitch. This device does not show a universal-type carrier which can be configured to transport a plurality of loads.

U.S. Pat. No. 4,635,835 issued to Cole on Jan. 13, 1987 shows a carrier apparatus for carrying an all-terrain vehicle. The carrier is specifically designed to carry the all-terrain vehicle by mounting to the rear axles of the vehicle. This carrier is very specific in design and is not configured to carry a plurality of various off-road vehicles.

Another type of transporting rack is shown in U.S. Pat. No. 4,277,008 issued to McCleary on July 7, 1981. This rack is of the type which mounts to the rear portion of an all-terrain vehicle. The rack shown in McCleary is not of the type which is cantilevered from the transporting vehicle, but rather one which is mounted at three different locations on the back of the transporting vehicle.

U.S. Pat. No. 4,815,638 issued to Hutyra and shown in the Mar. 28, 1989 publication of the *Official Gazette* of the United States Patent and Trademark Office shows a moped carrier which is mounted to the transporting vehicle's bumper. This carrier is specifically tailored to transporting mopeds and is not designed to transport a plurality of different vehicles.

All of the above-mentioned devices are cargo-specific and can only be used to transport a very limited number of items.

It is therefore a principal object of this invention to provide a universal wheelless carrier which can easily carry any number of items and easily mounts to a transporting vehicle's trailer hitch.

Another object of the present invention is to provide a carrier which allows one person to easily load and unload cargo.

A further object of this invention is to provide a wheelless carrier which can accommodate the irregular outer contours of various types of small recreational watercraft.

It is another object of this invention to provide a universal wheelless carrier which is mounted to a transporting vehicle's trailer hitch which does not significantly impact the gas mileage of the transporting vehicle.

Still yet another object of this invention is to provide a universal wheelless carrier which is light, easily removable, requires only a small storage space when not in use, and is relatively inexpensive with compared with the conventional two-wheel trailer.

Still another object of this invention is to provide a universal wheelless carrier which is inexpensive to purchase and maintain.

SUMMARY OF THE INVENTION

In light of the foregoing objects, the present invention provides a universal wheelless carrier mounted to a transporting vehicle's trailer hitch for transporting a load comprising a main elongated support member cantilevered from the trailer hitch having a first and second end, the first end adapted to be received and retained by the trailer hitch, the second end having two elongated parallel support beams, the beams slightly spaced-apart and longitudinally extending generally rearward from said transporting vehicle. A first load-bearing member positioned above and transverse to the elongated parallel support beams, having two distal ends extending substantially beyond and cantilevered from the beams, and a protruding pad located generally between the two ends, the pad adapted to be received between the slightly spaced apart beams and means for fastening the first load-bearing member to the spaced-apart beams.

A preferred embodiment of the present invention includes a second load-bearing member positioned above and transverse to the elongated parallel support arms, the second load-bearing member having two distal ends extending substantially beyond and cantilevered from the beams and a protruding pad located generally between the two ends, the pad adapted to be received between the slightly spaced-apart beams, the second load-bearing member spaced from the first load-bearing member, and means for fastening the second load-bearing member to the spaced-apart beams. The first and second load-bearing members are preferably substantially parallel, and the second load-bearing member is so spaced from the first load-bearing member, so as to provide ample room within the space for a user to maneuver a load onto the first and second load-bearing members. A portion of the first end of the main. elongated support member is preferably located between and abutted against the two elongated parallel support beams, and the portion of the first end of the main elongated support member defines the spacing between the beams which are slightly spaced apart. Preferably, the first end of the main elongated support member has two spaced portions which are located between and abutted against the two elongated parallel support beams.

In one embodiment, the first and second load-bearing members have a generally large flat surface with a portion of the large flat surface adapted to receive a portion of the load for resisting any tendency of the load to move while the move is being transported.

In another embodiment, the means for fastening the first and second load-bearing members to the spaced apart beams includes means for pivoting the first and second load-bearing members with respect to the spaced-apart beams, the pivoting means permitting the first and second load-bearing members to align themselves with an irregularly-shaped load such that the weight of the load is borne uniformly across the first and second load-bearing members.

Still, in another embodiment of the present invention, the first and second load-bearing members support a hollow enclosure, the enclosure used for completely encapsulating the load.

These, together with other objects and advantages which will become subsequently apparent, reside in the details of construction and operation as more fully hereinafter are described and claimed.

BRIEF DESCRIPTION OF THE DRAWINGS

FIG. 20 is a perspective view of a pick-up truck mounted to a wheelless carrier which is configured as a general-purpose enclosure.

FIG. 21 is an isometric view of the wheelless carrier and associated support structure which accompanies the enclosure shown in FIG. 20.

FIG. 22 is a plan view of the wheelless carrier and support frame shown in FIG. 21.

DETAILED DESCRIPTION OF THE PREFERRED EMBODIMENTS

Figure 1:
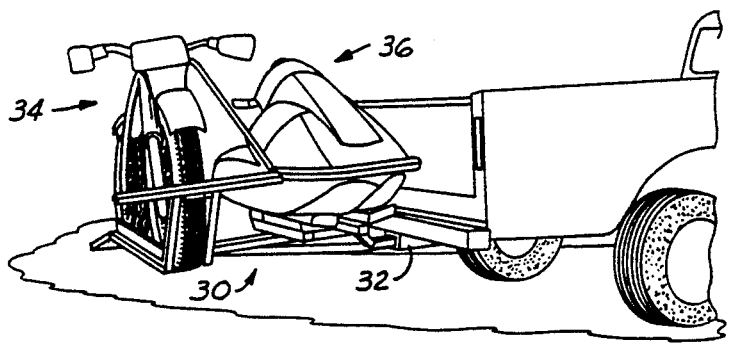
FIG. 1 is a perspective view of a pick-up truck which has mounted to its trailer hitch a wheelless carrier. On the wheelless carrier is arranged a motorcycle and a personal watercraft.

Referring now to FIG. 1 of the drawings, wheelless carrier 30 is cantilevered from vehicle trailer hitch 32. In this configuration of the wheelless carrier 30, an off-road motorcycle 34 and a personal watercraft 36 are shown mounted to the carrier. As will be shown in more detail, the wheelless carrier can be readily configured to carry any number of off-road type vehicles and can also be used for general purpose hauling.

Figure 2:
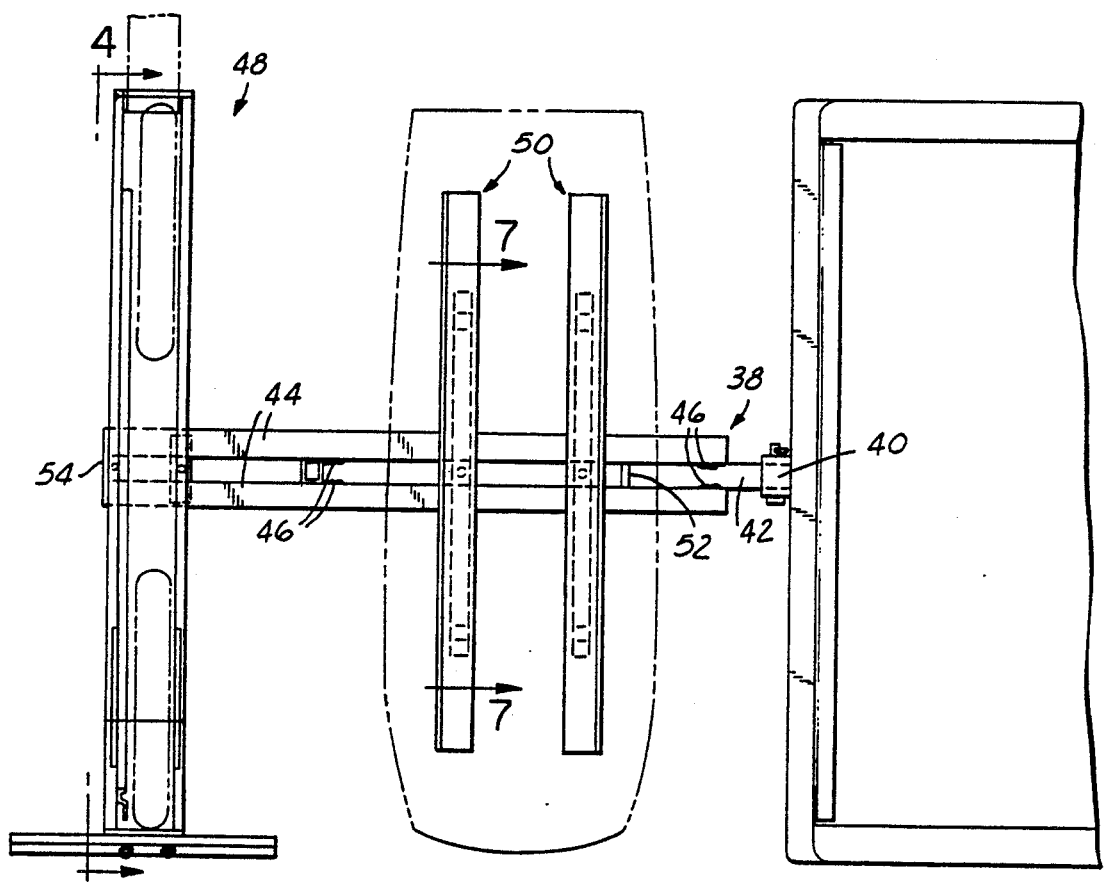
FIG. 2 is a plan view showing the wheelless carrier of FIG. 1.

Now referring to FIG. 2 of the drawings, a top view of the wheelless carrier of FIG. 1 is shown with the vehicles removed. The wheelless carrier is comprised of a main elongated support member 38 which is cantilevered from the trailering vehicle's trailer hitch 40. The main elongated support member 38 is comprised of two main sections. The first section includes a first support beam member 42 which has one end adapted to be received into the vehicle's trailer hitch 40. As will be understood by those skilled in the art, receiver-type trailer hitches (Reese ™, DrawTight ™, etc.) are the preferred type of hitch to be used when employing a wheelless carrier of the type herein described. This is because the cantilevered manner in which wheelless carriers are mounted cannot be readily accommodated by a conventional "ball" type trailer mount. First support beam 42 extends directly rearward from the towing vehicle and is sandwiched between a bifurcations of second support beam 44. The first support beam 42 is connected to second support beam bifurcations 44 at a number of locations 46. It is contemplated that in the preferred embodiment, first support beam 42 and second support beam 44 are constructed from metal tubing, preferably rectangular in shape. The space between the bifurcations is preferably less than five inches. The bifurcations of second support beam 44 provide the support for motorcycle platform 48 and personal watercraft platforms 50. Separating support pin 52 and separating support plate 54 both act to strengthen bifurcations of second support beam 44 and accordingly prevent any type of tendency they may have to split or separate when placed under load.

Figure 3:
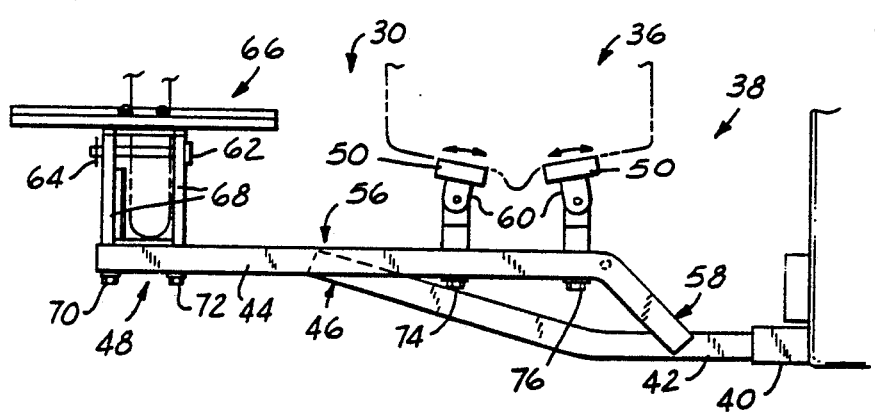
FIG. 3 is a front view of the wheelless carrier of FIG. 1.

As best shown in FIG. 3 of the drawings, a front view of the wheelless carrier of FIG. 1 shows the first support beam 42 extending out from trailer hitch 40. First support beam 42 slopes upward at 46 and is received between second support beam bifurcations 44. First support beam 42 is preferably sandwiched between second support beam bifurcations 44 in two places 56, 58. This construction provides for a lightweight but strong frame upon which a load can be placed without any possibility of the frame twisting or shearing. Platform pivots 60 are provided so that when transporting a personal watercraft 36, the personal watercraft platforms 50 are free to pivot so that they align themselves with the hull of the personal watercraft 36 so that the weight of the personal watercraft is evenly distributed over the entire face of platforms 50. Motorcycle platform 48 is provided with a front wheel retention means 66. The front wheel retention means 66 generally includes a rail structure 68 and a retaining pin 62 which slides through holes found in rail structure 68, thereby pinning the front wheel of the motorcycle 34 to the rail structure 68. Pin 62 is kept in place by clip 64. Both motorcycle platform 48 and personal watercraft platforms 50 are mounted to second support beam bifurcations 44 by means of bolts 70–76. Use of bolts 70–76 to retain the platforms 48, 50 allows various other platforms to be installed on the wheelless carrier 30. By having the flexibility of reconfiguring the wheelless carrier 30 to accommodate different transporting needs, the carrier is indeed a universal type which makes use of a common main elongated support beam 38. By having a common main elongated support beam 38, a user only needs to purchase the additional platforms needed to accommodate his different transporting needs.

Figure 4:
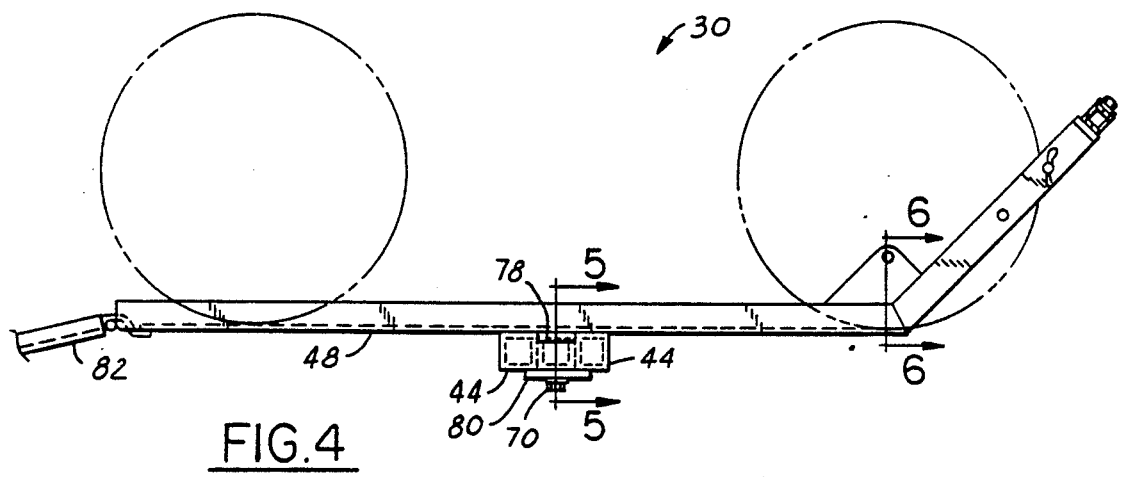
FIG. 4 is a sectional view taken substantially on line 4—4 of FIG. 2.

Now referring to FIG. 4 which shows the side view of wheelless carrier 30 of FIG. 1, motorcycle platform 48 is shown laying across second support beam bifurcations 44. Locating pad 78 is affixed to the bottom of motorcycle platform 48 and prevents the motorcycle platform 48 from shifting. Locating pad 78 is sized to fit snugly between the second support beam bifurcations 44. Platform 48 is kept in place by way of bolt 70 in conjunction with shoulder plate 80. Motorcycle platform 48 can be located along said second support beam bifurcations 44 by simply loosening bolt 70 and pushing or pulling on platform 48 along the longitudinal axis of the main elongated support member. Ramp 82 is provided so that motorcycle 34 (not shown) may be driven or pushed onto platform 48.

Figure 5:
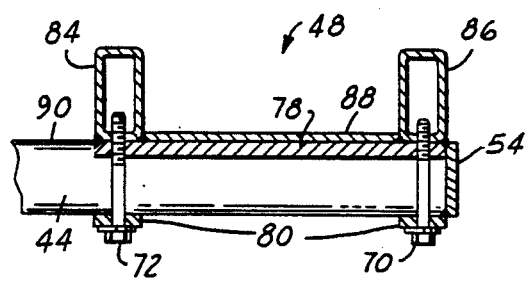
FIG. 5 is a vertical sectional view taken substantially on the line 5—5 of FIG. 4.

Now referring to FIG. 5 which shows the vertical cross-section of the wheelless carrier of FIG. 4 taken substantially along lines 5—5, motorcycle platform 48 is affixed to second support beam 44 by way of bolts 70, 72. Bolts 70, 72 are supported below support beam 44 by shoulder plate 80 and extend through support beam 44, through locating pad 78, and into platform rails 84, 86. It is contemplated that locating pad 78 along with platform rails 84, 86 are drilled and tapped to accept bolts 70, 72. It is impractical to place a nut on bolts 70, 72 since this is an inaccessible location. Motorcycle platform 48 is made of platform rail 84, 86, platform floor 88, and locating pad 78. Locating pad 78 is sized to fit in between second support beam bifurcations 44 and rides below the support beam bifurcations' topmost surface 90. Locating pad 78 enables platform 48 to slide longitudinally along second support beam 44 when bolts 70, 72 are loosened. It also prevents platform 48 from moving or sliding perpendicular to the longitudinal axis of support beam 44. Separating support plate 54 acts to keep the bifurcated ends of second support beam 44 at their proper separation so that the beams do not bend under load and pinch or crimp locating pads 78.

Figure 6:
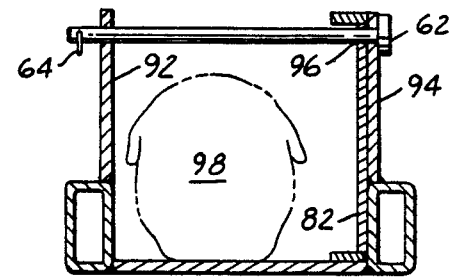
FIG. 6 is a vertical sectional view taken substantially on the line 6—6 of FIG. 4.

Now referring to FIG. 6 of the drawings, the wheel 98 of motorcycle 34 (not shown) is located between pin support plate 92, 94. Pin 62 is inserted through pin support plate 94, through the center portion of wheel 98 and through pin support plate 92. Clip 64 is affixed to the end of retaining pin 62 to prevent any vibration from forcing retaining pin 62 out. Ramp 82 is shown abutted against pin support plate 94. This location provides a convenient way of transporting and storing ramp 82 when it is not in use. Ramp 82 is provided with a retaining hole 96 so that when retaining pin 62 is inserted in place, it would also act to retain ramp 82. This will prevent any road vibrations from working ramp 82 loose from its storage position.

Figure 7:
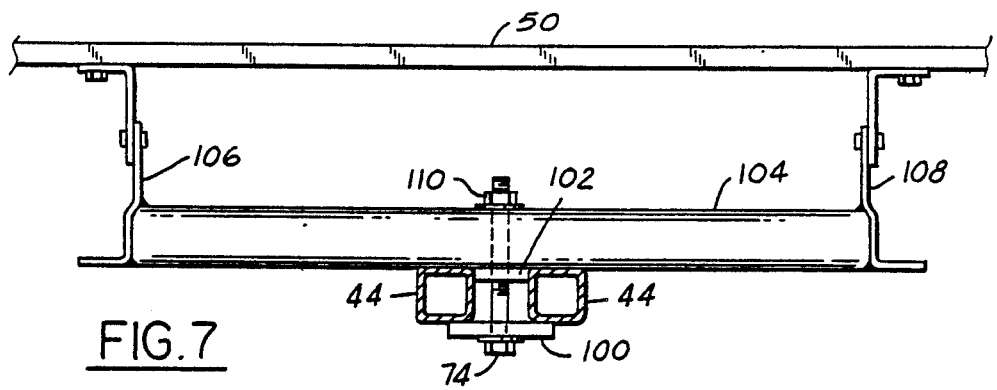
FIG. 7 is a fragmentary vertical sectional view taken substantially on the line 7—7 of FIG. 2.

Now referring FIG. 7 of the drawings, personal watercraft platform 50 is supported by hinges 106, 108. Hinges 106, 108 allow personal watercraft platforms 50 to pivot with respect to transverse member 104. This pivoting is necessary in order that platform 50 support the hull of personal watercraft 36 (not shown) along the full length of its face. Transverse support member 104 is affixed to second support beams 44 in much the same manner as motorcycle 48, as described in FIGS. 4–6, the main difference being that bolt 74 is affixed to support member 104 by way of nut 110. Support member 104 is provided with a locating pad 102 in order to keep support member 104 centered upon second support beam 44. Shoulder plate 100 is provided to grip support member 104 when bolt 74 is tightened. Since two platforms 50 are needed to carry a single personal watercraft (see FIG. 2), the distance between each of the platforms 50 may be adjusted to accommodate individual watercraft hull designs. For example, in personal watercraft employing wider hull designs, the platforms 50 would probably be adjusted for a greater distance between them so that watercraft stability would be maintained during transporting. For personal watercraft of narrow hull designs, it would be necessary to reduce the distance between platforms 50. Adjusting of the distance between platforms 50 is achieved by simply loosening nuts 74, 76 (see FIG. 3) and sliding platforms 50 along the longitudinal axis of main elongated support beam 38.

Figure 8:
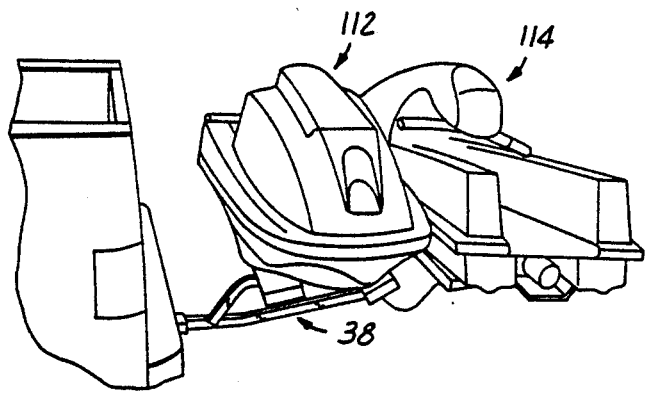
FIG. 8 is a perspective view of two personal watercraft which are being transported on a wheelless carrier which is mounted to the trailer hitch of a transporting pick-up truck.

As best shown by FIG. 8 of the drawings, the wheelless carrier of the present invention is not limited to one configuration, such as the configuration shown in FIGS. 1–7. The wheelless carrier of the present invention is truly universal in that it can be configured to transport a wide variety and combinations of vehicles. FIG. 8 shows the main elongated support beam 38, as has been previously described, configured to support two personal watercraft vehicles.

Figure 9:
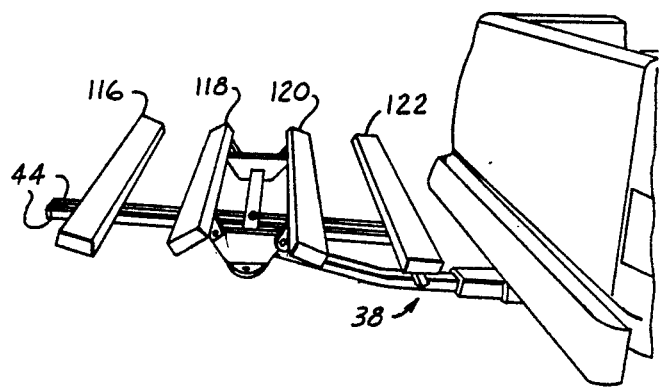
FIG. 9 is a perspective view of the wheelless carrier arrangement of FIG. 8 without the personal watercraft mounted on the carrier.

Now referring to FIG. 9, two sets of personal watercraft platforms 116, 118 and 120, 122 are attached to main elongated support beam 38 in order to carry the two personal watercraft as shown in FIG. 8. Platforms 116–122 are affixed to second support beam 44 in a similar way as that described in FIG. 7.

Figure 10:
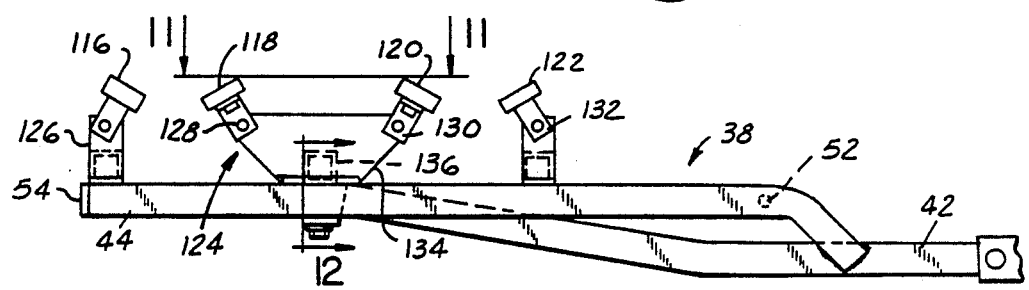
FIG. 10 is a front view of the wheelless carrier shown in FIG. 9.

Now referring to FIG. 10, main elongated support beam 38 is constructed exactly as previously described. Hinges 126, 132 are likewise identical to those hinges 106, 108 previously described. Dual support platform 124 provides one watercraft platform 118 for the rearwardly positioned personal watercraft and one platform support 120 for the forwardly positioned personal watercraft. Platforms 118, 120 share a common support plate 134. This plate 134 is fixed to a transverse support member 136 which is attached to second support beam 44 (see FIG. 12 and description thereof).

Figure 11:
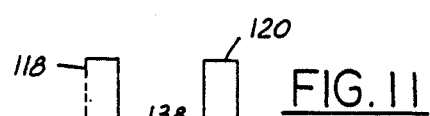
FIG. 11 is a partial top view of the wheelless carrier of FIG. 10.

Now referring to FIG. 11 which shows a partial top view of the carrier arrangement of FIG. 10, two platforms 118, 120 are supported by a common transverse support member 136. The common transverse support member 136 has affixed to each of its ends support plate 134, 138. Hinge members 128, 140 fix platform 118 to support plates 134, 138. Likewise, hinge members 130, 132 affix platform 120 to support plate 134, 138. Transverse support member 136 is fixed to support beam 44 by way of bolt 144.

Figure 12:
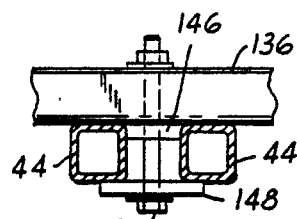
FIG. 12 is a vertical sectional view taken substantially on line 12—12 of FIG. 10.

Now referring to FIG. 12 of the drawings, second support beam 44 supports the transverse support member 136. Transverse support member 136 is provided with a locating pad 146 affixed to its lower surface. Locating pad 146 allows transport support member 136 to slide along the longitudinal axis of second support beam 44 when bolt 144 is loose. Shoulder plate 148 provides a gripping surface for bolt 144 once the transverse support member is properly positioned.

Figure 13:
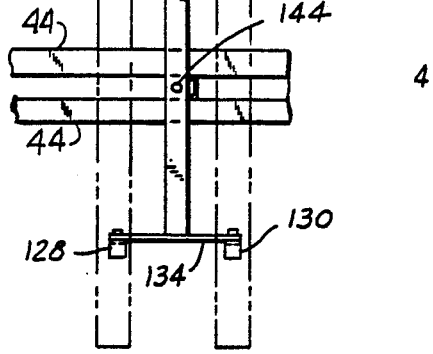
FIG. 13 is a perspective view of the wheelless carrier as it would be configured to transport a four-wheel all-terrain vehicle.
Figure 19:
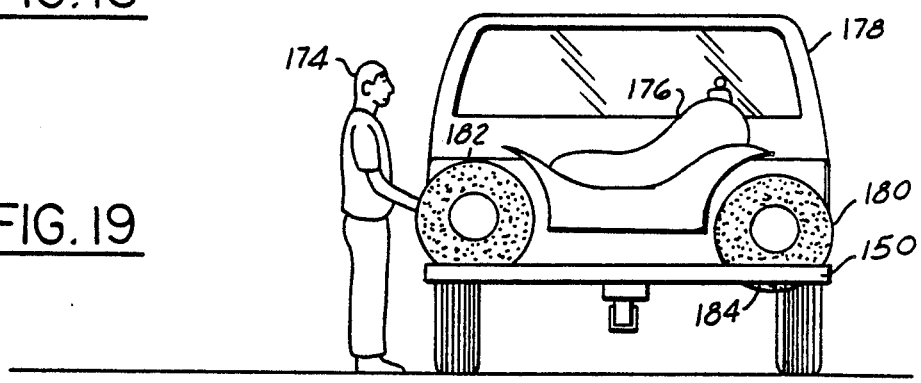

As best shown in FIG. 13 of the drawings, the wheelless carrier, in addition to the above embodiments, can also be configured to transport a four-wheel all-terrain vehicle (ATV). Wheelless carrier 30 is comprised of a main elongated support beam 38 and ATV platforms 150, 152. Main elongated support beam 38 is constructed in an identical manner to that in FIGS. 1–12 and will not be discussed further herein. ATV platforms 150, 152 are constructed from a frame of rectangular tubing 154 which is partially covered with a wire mesh 156. Wire mesh 156 prevents the build-up of moisture and minimizes the amount of slippage which would otherwise be present on the surface of ATV platform 150, 152 if it were covered by a solid material. Wire mesh 156 allows any debris or moisture to fall through the platforms 150, 152. One portion of ATV platform 150, 152 is not covered by the wire mesh (see 158, 160). This open section 158, 160 is sized appropriately so that two wheels of the ATV (not shown) will rest within these openings 158, 160 without falling through. By allowing two of the wheels of the transporting ATV to rest within openings 158, 160, any tendency of the transporting vehicle to roll or shift is minimized. FIG. 19 shows a four-wheel ATV as it is positioned on the ATV platforms 150, 152. Note the bottom portion of one of the two front wheels 184 protruding through opening 154 (not visible) and visible below ATV platform 150.

Figure 14:
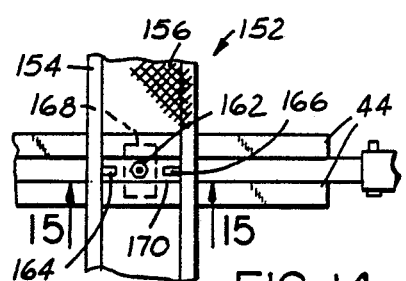
FIG. 14 is a partial plan view taken substantially on line 14—14 of FIG. 13.

Now referring to FIG. 14, ATV platform 152 is fastened to second support beam bifurcations 44 by way of nut 162 and bolt 172 (not shown). Locating pad 170 is welded to the base of frame 154 and is further strengthened by gusset plates 164, 166. Shoulder plate 168 is mounted between bolt 172 (not shown) and second support beam 44 to provide additional gripping support.

Figure 15:
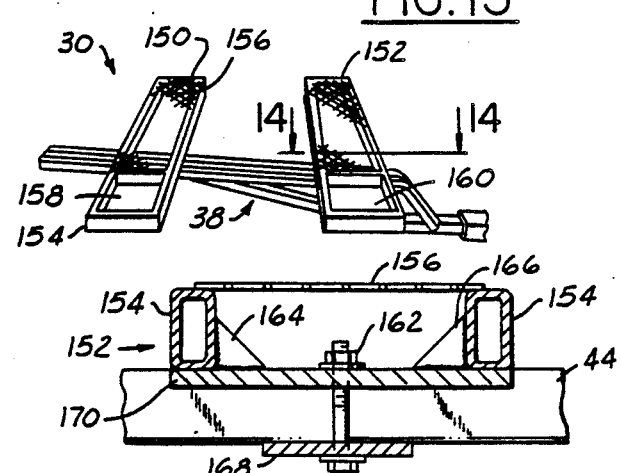
FIG. 15 is a vertical sectional view taken substantially on line 15—15 of FIG. 14.

Now referring to FIG. 15, ATV platform 152 is shown resting upon support beam 44. Locating pad 170 is attached to the outer ends of rectangular frame 154. Gusset plates 164, 166 add additional support between rectangular frame 154 and locating pad 170. Wire mesh 156 extends across rectangular frame 154. Bolt 172 provides the fastening means by which platform 152 is affixed to beam 44. Bolt 172 is provided with a shoulder plate 168 to provide a greater gripping surface than that which would normally be available from merely using a single bolt.

Because of the unique construction of carrier 30 as depicted in FIG. 13, a user can simply walk between ATV platforms 150, 152 without stepping over any support member. This unique feature allows a single person to load and unload ATV vehicles in an easy and straightforward manner. The preferred method for loading and unloading carrier 30 is depicted in FIGS. 16–19.

Figure 16:
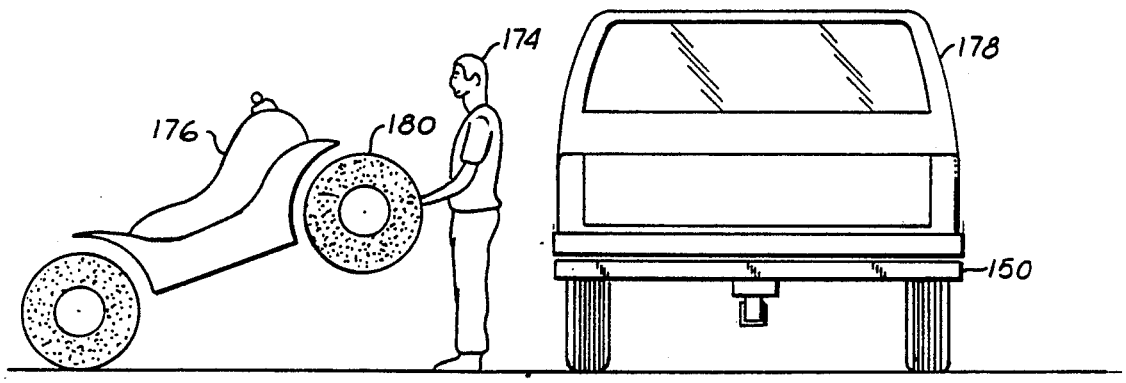
FIGS. 16-19 illustrate the method used in loading a four-wheel all-terrain vehicle onto the wheelless carrier of FIG. 13.
Figure 17:
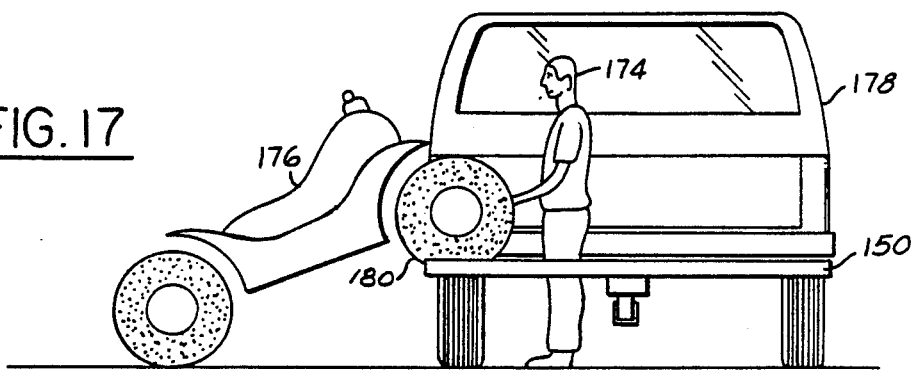
Figure 18:
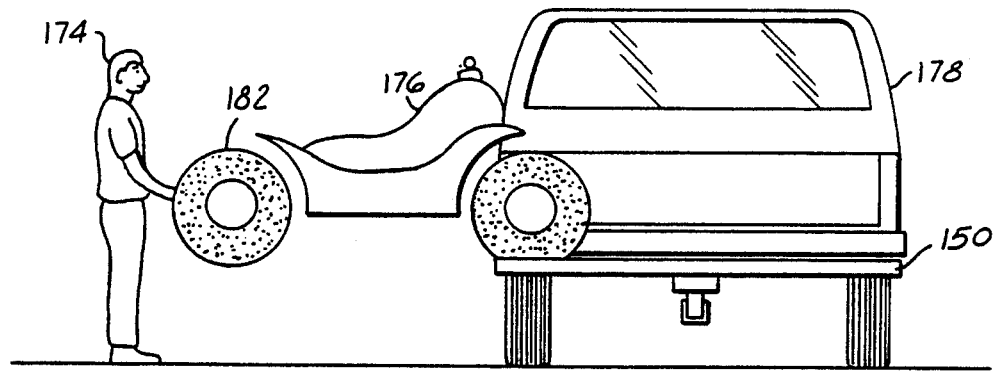

FIG. 16 shows the initial position assumed by the user 174, ATV 176 and transporting vehicle 178. The user 174 positions ATV 176 so that its wheels are aligned with ATV platforms 150, 152 (ATV platform 152 cannot be seen from this view). Once the ATV is in position, the user 174 picks up one end of the ATV and walks backward between ATV platforms 150, 152 and places the first set of wheels 180 down upon ATV platforms 150, 152. The manner of loading herein described is only made possible because the user does not have to step over any type of support bracing associated with the carrier frame. This is an important feature of the disclosed invention. After user 174 has placed the first set of wheels 180 upon ATV platforms 150, 152, he simply steps out from between platforms 150, 152 and walks around to the back of the ATV vehicle as depicted in FIG. 18. User 174 then picks up the rear portion of ATV 176 and pushes the ATV 176 along ATV platforms 150, 152 until the second set of wheels 182 are positioned above platforms 150, 152. The second set of wheels 182 are then lowered onto ATV platforms 150, 152. FIG. 19 depicts the final resting position of ATV 176 as it will be transported by the transporting vehicle 178. Note the position of the first set of wheels 180 in relation to ATV platforms 150, 152. The first set of wheels 180 is shown received within open section 158 (not visible) of ATV platforms 150, 152. First set of wheels 180 is shown protruding through the platform 150, 152 and partially visible at 184.

It is important to note that the method described above for loading the four-wheel ATV is also applicable to mounting a motorcycle or personal watercraft. This method is applicable to all forms of personal recreational vehicles because all of the embodiments of the present carrier include open-end sections where a user is free to enter into without having to step over any support member during the loading of a vehicle.

Now referring to FIG. 20 of the drawings, a weatherproof enclosure 186 is shown mounted to the main elongated support beam 38 (not shown). This weatherproof enclosure 186 is separable into two halves, an upper half 188 and a lower half 190. As will be described shortly, the lower half 190 is fastened to a support structure, and the upper half 188 is fastened to the lower half 190 by virtue of a hinge section and a locking latch (hinge section and locking latch not shown). In its preferred embodiment, weatherproof enclosure 186 is formed out of a lightweight substance such as Fiberglas TM, plastic or aluminum so that it can be easily lifted and mounted to the underlying main elongated support beam 38. In this embodiment of the wheelless carrier, the weatherproof enclosure should be made large enough to accommodate most general purpose hauling needs, but should not be made too large so that it begins to be cumbersome to mount onto the main elongated support beam 38 or maneuver while driving the transporting vehicle 192.

Now referring to FIG. 21, main elongated support beam 38 is identical in its construction to that which has been previously described and will not be elaborated upon here, except to call attention to its universal character. It has been shown that main elongated support beam 38 has been able to support a motorcycle and a personal watercraft (FIG. 1), two personal watercraft (FIG. 8), a four-wheel ATV (FIG. 13), and a weatherproof enclosure (FIG. 20). Many other combinations of support platforms may be added to the base main elongated support beam 38 to accommodate a multiplicity of transporting needs (such as bicycles, riding lawn mowers, etc.). This universal character of the disclosed carrier is truly a testimony to the adaptability of its transporting capabilities. Enclosure support frame 194 is designed to support enclosure 186 and also provides a means of fastening enclosure 186 to main elongated support member 38. Enclosure support frame 194 is constructed from two longitudinal support frame members 196, 198 and three transverse support frame members 200, 202 and 204.

In its preferred embodiment, the longitudinal and transverse support frame members are constructed of steel or aluminum stock, preferably tubular, which is welded together. It is also possible to design weatherproof enclosure 186 from a superior enough material such that an enclosure support frame 194 is not needed. In order to eliminate the use of an enclosure support frame 194, the structural integrity of enclosure 186 would have to be sufficient to support the types of loads that are normally carried by such a general purpose enclosure.

As best shown in FIG. 22 of the drawings, enclosure support frame 194 is supported by main elongated support beam 38 by virtue of transverse support frame members 202, 204. Transverse support frame members 202, 204 are fastened to main elongated support beam 38 in a similar fashion to that which has already been described in previous embodiments. In its preferred embodiment, enclosure support frame 94 is envisioned to normally stay attached to the bottom of weatherproof enclosure 190 (not shown). To detach the enclosure support frame 194 from main elongated support beam 38, one only needs to unfasten bolts 206, 208. Frame 194 has locating pads mounted underneath transverse support frame members 202, 204 identical to the locating pads which are mounted under ATV platforms 152 (see number 170 in FIG. 15) and transverse support member 136 (see 146 of FIG. 12). Enclosure support frame 194 has two additional locating pads 210, 212. These locating pads 210, 212 are in addition to the locating pads 214, 216. Locating pads 210, 212 are used whenever it is desirable to mount the weatherproof enclosure 186 in a position which is orthogonal to the position shown in FIG. 22. This may be desirable for certain enclosures which are designed longer than they are wide.

By alternatively mounting the enclosure with its longitudinal axis transverse to the longitudinal axis of the main elongated support beam, the enclosure 186 will not extend beyond the end of main elongated support beam 38. However, on some trailering vehicles, particularly those of smaller size, it may be desirable to allow the longitudinal axis of the enclosure 186 to coincide with the longitudinal axis of main support beam 38. This will minimize the extent to which the enclosure sticks out beyond the sides of the trailering vehicle. By providing two sets of locating pads (210, 212; 214, 216), the user is provided the flexibility to mount the enclosure 186 in the orientation which is most suitable for the particular user's needs.

Figure 23:
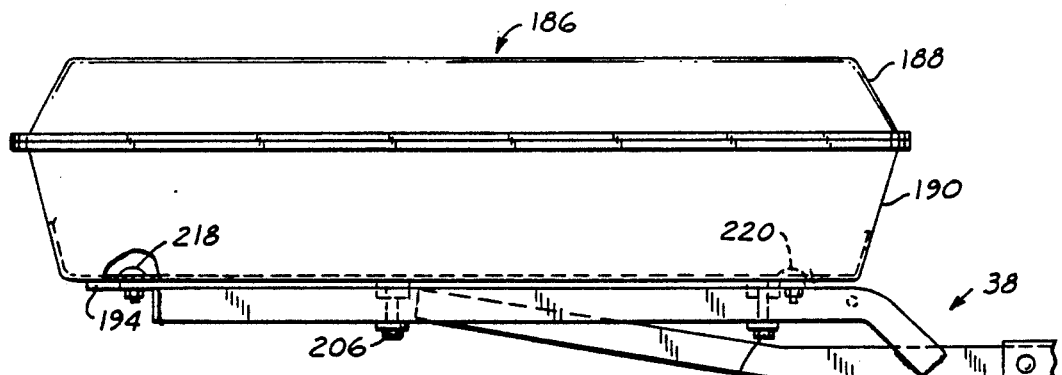
FIG. 23 is a side view of the wheelless carrier shown in FIG. 20.

Now referring to FIG. 23, enclosure 186 is shown mounted to enclosure support frame 194. Enclosure support frame 194 is mounted to main elongated support beam 38 by bolts 206 and 208. Bolts 218 and 220 pass through the lower half of enclosure 190 and fasten it to enclosure support frame 194.

Figure 24:
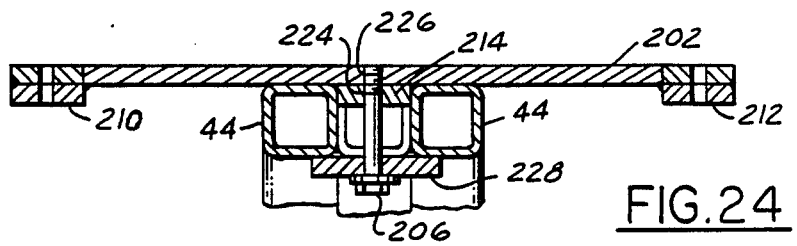
FIG. 24 is a vertical sectional view taken substantially on line 24—24 of FIG. 22.

As best shown in FIG. 24 of the drawings, a vertical cross-sectional view taken substantially along line 24—24 of FIG. 22 shows transverse support frame member 202 supported on top of second support beam 44. Locating pad 214 is fastened to the bottom of frame member 202 to locate frame member 202 centrally upon beam 44. Bolt 206 passes through shoulder plate 228, as seen in the previous embodiments, and secures support member 202 to the support beam 44. Because of the close proximity of enclosure 190 and top face of transverse support member 202, bolt 206 cannot be fastened to transverse support member 202 by virtue of a threaded nut. Accordingly, a portion of transverse support member 202 and locating pad 214 must be drilled and tapped. The drilled and tapped portion of transverse support member 202 is shown at 226. The drilled and tapped portion of locating pad 214 is shown at 224. In the orientation of support frame 194 which is shown in FIG. 24, locating pads 210, 212 are not utilized. However, when support frame 194 is rotated ninety degrees, as depicted in FIG. 27, locating pads 210, 212 are located between second support beam bifurcations 44.

Figure 25:
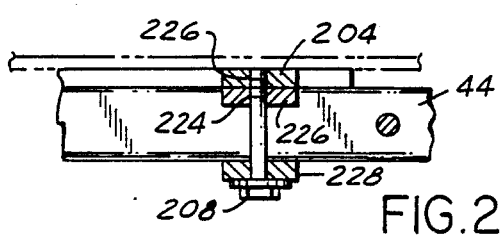
FIG. 25 is a fragmentary vertical sectional view taken substantially on line 25—25 of FIG. 22.

Now referring to FIG. 25 which is a vertical cross-section taken essentially along line 25—25 of FIG. 22, bolt 208 passes through shoulder plate 228, through support beam bifurcations 44 and is threaded into locating pad 216 and transverse support member 204.

Figure 26:
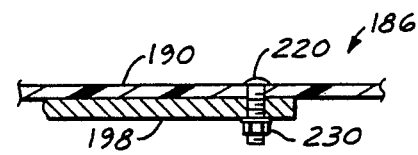
FIG. 26 is a fragmentary sectional view taken substantially along line 26—26 of FIG. 22.

Now referring to FIG. 26, the lower half 190 of weatherproof enclosure 186 is bolted to longitudinal support member 198 by way of bolt 220 and nut 230. Bolt 220 is preferably of the type with a rounded head so that it does not scratch or mar any of the contents of weatherproof enclosure 186.

Figure 27:
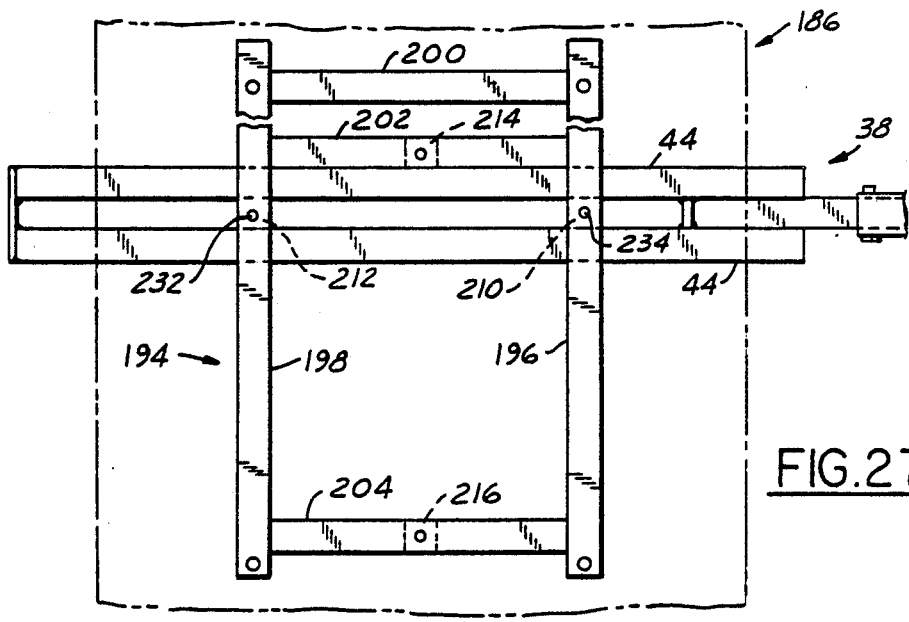
FIG. 27 is a plan view of an alternative mounting of the support structure shown in FIG. 21.

Now referring to FIG. 27, enclosure support frame 194 is shown mounted to main elongated support beam 38 by way of bolts 232, 234. This orientation of support frame 194 is shown in contrast to the orientation of support frame 194 as shown in FIGS. 22-26. The orientation shown in FIG. 27 allows the longitudinal axis of enclosure 198 to be perpendicular to the longitudinal axis of main elongated support member 38. Locating pads 210, 212 act to keep the longitudinal support members 196, 198 centered upon second support beam 44. In this orientation of support frame 194, locating pads 214, 216 are not used.

The foregoing detailed description shows that the preferred embodiments of the present invention are well-suited to fulfill the objects stated. It is recognized that those skilled in the art may make various modifications or additions to the preferred embodiments chosen here to illustrate the present invention, without departing from the spirit of the present invention. For example, the main elongated support beam may be fashioned from a single metal stamping as opposed to three distinct tubular elements as disclosed in the present application. As a second example, the various support platforms used to directly support the transported vehicles may be fashioned or fabricated using any number of popular techniques. As a third example, the dimension and size of the carrier can be designed to fit any number of families of vehicles and/or load-carrying requirements (such as bicycles, snowmobiles, riding lawn mowers, etc.). Accordingly, it is to be understood that the protection sought to be afforded hereby should be deemed to extend to the subject matter defined in the appended claims, including all fair equivalents thereof.

I claim:

1. A universal wheelless carrier mounted to a transporting vehicle's trailer hitch for transporting a load, comprising:

a main elongated support member cantilevered from said trailer hitch, said main elongated support member having a first and second end, said first end adapted to be received and retained by said trailer hitch, said second end having two elongated parallel support beams, said beams slightly spaced apart and longitudinally extending generally rearward from said transporting vehicle;

a first load-bearing member positioned above and transverse to said elongated parallel support beams, said first load-bearing member having two distal ends and a locating pad, said distal ends extending substantially beyond and cantilevered from said beams and said locating pad protruding from said first load-bearing member and located between said two ends, said locating pad adapted to be received between said slightly spaced apart beams; and means for fastening said first load-bearing member to said spaced apart beams.

2. The wheelless carrier of claim 1, further including a second load-bearing member positioned above and transverse to said elongated parallel support beams, said second load-bearing member having two distal ends extending substantially beyond and cantilevered from said beams and a locating pad protruding from said second load-bearing member and located between said two ends, said locating pad adapted to be received between said slightly spaced apart beams, said second load-bearing member spaced from said first load-bearing member; and means for fastening said second load-bearing member to said spaced apart beams.

3. The wheelless carrier of claim 2, wherein said slightly spaced part beams form a longitudinal gap therebetween and said locating pad of said first load-bearing member is longitudinally locatable within said gap.

4. The wheelless carrier of claim 1, wherein a portion of said first end of said main elongated support member is located between and abutted against said two elongated parallel support beams, and wherein said portion of said first end of said main elongated support member defines the spacing distance between said beams which are slightly spaced apart.

5. The wheelless carrier of claim 4, wherein two spaced portions of said first end of said main elongated support member are located between and abutted against said two elongated parallel support beams.

6. The wheelless carrier of claim 5, wherein said first and second load-bearing members have a generally large flat surface with a portion of said large flat surface adapted to receive a portion of said load for resisting any tendency of said load to move while said load is being transported.

7. The wheelless carrier of claim 5, wherein said means for fastening said first and second load-bearing members to said spaced apart beams includes means for pivoting said first and second load-bearing members with respect to said spaced apart beams, said pivoting means permitting said first and second load-bearing members to align themselves with an irregularly shaped load such that the weight of said load is borne uniformly across said first and second load-bearing members.

8. The wheelless carrier of claim 5, wherein said first and second load-bearing members support a hollow enclosure, said enclosure used to completely encapsulate said load.

9. A universal wheelless trailer mounted to a transporting vehicle's trailer hitch for transporting a load, comprising:

a main elongated support member cantilevered from said trailer hitch, said main elongated support member having a first and second end, said first end adapted to be received and retained by said trailer hitch, said second end having two elongated parallel support beams, said beams slightly spaced apart and longitudinally extending generally rearward from said transporting vehicle;

a first load-bearing member positioned above and transverse to said elongated parallel support beams, said first load-bearing member having two distal ends and a locating pad, said distal ends extending substantially beyond and cantilevered from said beams and said locating pad protruding from said first load-bearing member and located between said two ends, said locating pad adapted to be received between said slightly spaced apart beams;

means for fastening said first load-bearing member to said spaced apart beams;

a second load-bearing member positioned above and transverse to said elongated parallel support beams, said second load-bearing member having two distal ends extending substantially beyond and cantilevered from said beams and a locating pad protruding from said second load-bearing member and located generally between said two ends, said locating pad adapted to be received between said slightly spaced apart beams, said second load-bearing member spaced from said first load-bearing member; and means for fastening said second load-bearing member to said spaced apart beams.

10. The wheelless carrier of claim 9, wherein said slightly spaced part beams form a longitudinal gap therebetween and said locating pad of said first load-bearing member is longitudinally locatable within said gap.

11. The wheelless carrier of claim 10, wherein said locating pad of said second load-bearing member is locatable within said longitudinal gap.

12. The wheelless carrier of claim 11, wherein a portion of said first end of said main elongated support member is located between and abutted against said two elongated parallel support beams, and wherein said portion of said first end of said main elongated support member defines the spacing distance between said beams which are slightly spaced apart.

13. The wheelless carrier of claim 12, wherein two spaced portions of said first end of said main elongated support member are located between and abutted against said two elongated parallel support beams.

14. The wheelless carrier of claim 13, wherein said first and second load-bearing members have a generally large flat surface with a portion of said large flat surface adapted to receive a portion of said load for resisting any tendency of said load to move while said load is being transported.

15. The wheelless carrier of claim 13, wherein said means for fastening said first and second load-bearing members to said spaced apart beams includes means for pivoting said first and second load-bearing members with respect to said spaced apart beams, said pivoting means permitting said first and second load-bearing members to align themselves with an irregularly shaped load such that the weight of said load is borne uniformly across said first and second load-bearing members.

16. The wheelless carrier of claim 13, wherein said first and second load-bearing members support a hollow enclosure, said enclosure used to completely encapsulate said load.

17. A general purpose carrier of the type which is cantilevered from the trailer hitch of a transporting vehicle, comprising:
   a main support member cantilevered from said hitch, said member having a first end which is adapted to be received by said hitch and a bifurcated second end having two generally parallel laterally spaced members, said support member extending generally longitudinally rearward from said vehicle and slightly upward;
   first and second load-bearing members, each having two distal ends extending beyond said support member, said load-bearing members positioned transverse to and cantilevered from said support members; and
   means for adjustably locating said first and second load-bearing members along said main support members at locations spaced towards and away from said hitch, said means for locating being disposed between said laterally spaced members.

18. The general purpose carrier of claim 17, wherein said first and second load-bearing members are cantilevered from said bifurcated second end of said main support member.

19. The general purpose carrier of claim 18, wherein said adjustable locating means includes a bolt means disposed between said bifurcations of said second end of said main support member.

20. The general purpose carrier of claim 19, wherein the space between said bifurcations of said second end is less than five inches.

* * * * *